Feb. 3, 1931.  E. R. SMITH ET AL  1,790,848
AUTOMATIC LATHE AND BLANK FEEDING MEANS THEREFOR
Filed Dec. 14, 1927   7 Sheets-Sheet 4

Inventors:
Edwin R. Smith
Albert Schimkez
by attorneys
Southgate Fay & Hawley

Witness
C. F. Wesson

Feb. 3, 1931.  E. R. SMITH ET AL  1,790,848
AUTOMATIC LATHE AND BLANK FEEDING MEANS THEREFOR
Filed Dec. 14, 1927  7 Sheets-Sheet 5

Feb. 3, 1931. E. R. SMITH ET AL 1,790,848
AUTOMATIC LATHE AND BLANK FEEDING MEANS THEREFOR
Filed Dec. 14, 1927    7 Sheets-Sheet 6

Patented Feb. 3, 1931

1,790,848

UNITED STATES PATENT OFFICE

EDWIN R. SMITH AND ALBERT SCHINKEZ, OF SENECA FALLS, NEW YORK, ASSIGNORS TO SENECA FALLS MACHINE CO., OF SENECA FALLS, NEW YORK, A CORPORATION OF MASSACHUSETTS

AUTOMATIC LATHE AND BLANK-FEEDING MEANS THEREFOR

Application filed December 14, 1927. Serial No. 240,042.

This invention relates to a lathe particularly designed for the automatic production of duplicate parts. While our invention is of general application, the lathe herein shown and described is particularly designed and adapted for the production of pistons for automobile engines.

It is the general object of our invention to provide a lathe in which duplicate parts may be machined at a reduced cost and with a minimum expenditure of time and labor on the part of the operator.

With this general object in view, an important feature of our invention relates to the provision of an improved automatic feeding and delivery mechanism for our improved lathe by which finished work may be conveniently removed and unfinished work inserted.

Another object of our invention is to provide improved tool operating mechanism and particularly improved mechanism for actuating the cross slide supporting the cutting tools.

Further features of our invention relate to improved mechanism for driving and controlling our improved lathe, to means for facilitating the inserting and driving of the work, and to other arrangements and combinations of parts which will be hereinafter described and more particularly pointed out in the appended claims.

A preferred form of our invention is shown in the drawings in which

Fig. 4 is a sectional side elevation through the main driving shaft and showing certain clutch and control mechanism;

Fig. 4ª is a detail sectional view, taken along the line 4ª—4ª in Fig. 4;

Fig. 5 is a detail plan view of certain operating mechanism;

Fig. 6 is a detail sectional view, taken along the line 6—6 in Fig. 7;

Fig. 11 is a plan view of the tool slides and associated parts;

Fig. 12 is an enlarged detail plan view of the actuating mechanism for the back tool slide;

Fig. 13 is a detail front elevation, looking in the direction of the arrow 13 in Fig. 12;

Fig. 14 is a detail side elevation, looking in the direction of the arrow 14 in Fig. 12;

Fig. 15 is an enlarged plan view of a portion of the work spindle, a piston supported thereon, and tools for machining the piston;

Fig. 16 is a sectional elevation, taken along the line 16—16 in Fig. 15;

Fig. 16ª is a detail view, looking in the direction of the arrow 16ª—16ª in Fig. 16;

Figure 1:
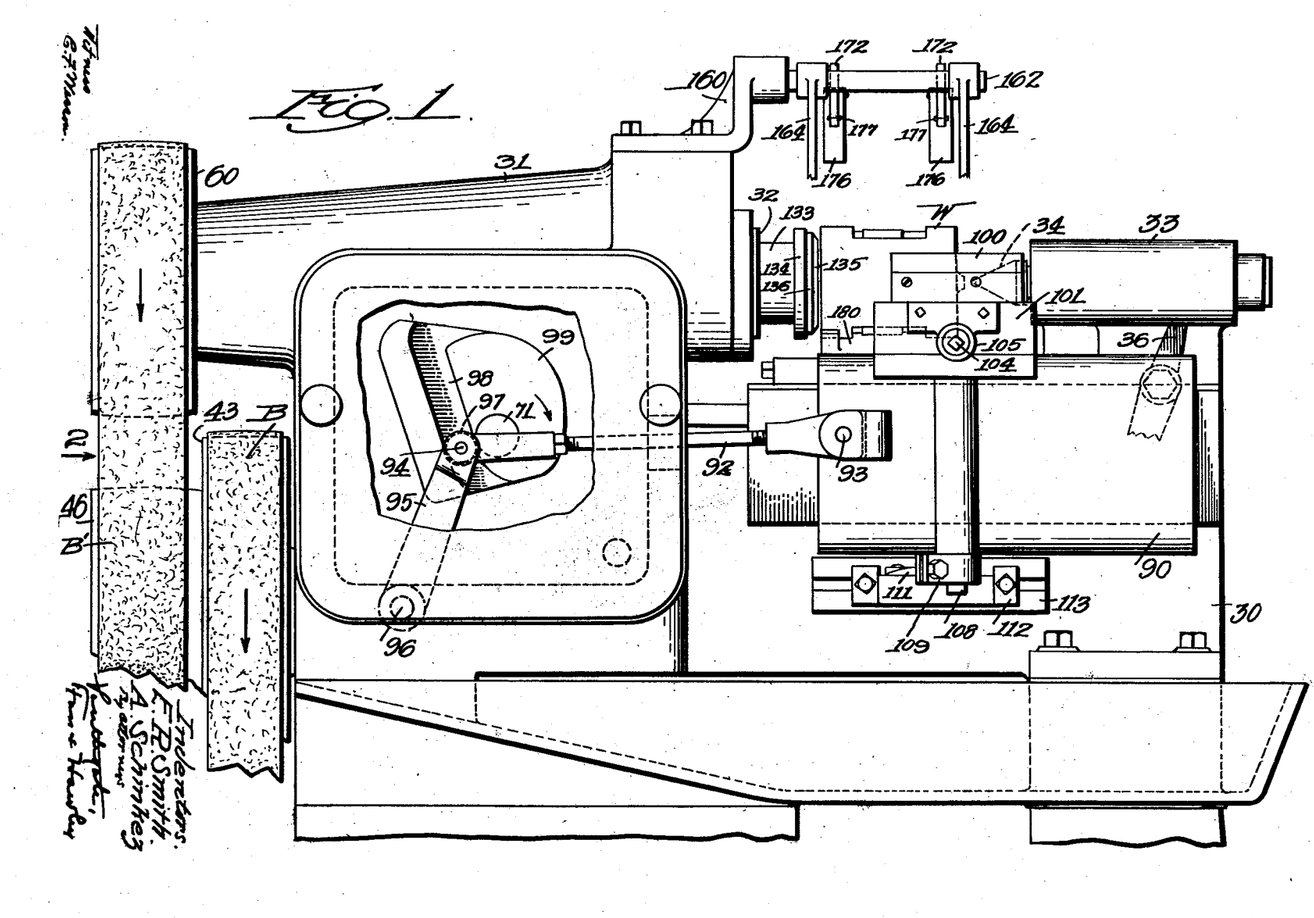
Fig. 1 is a side elevation of our improved lathe with certain parts broken away.
Figure 2:
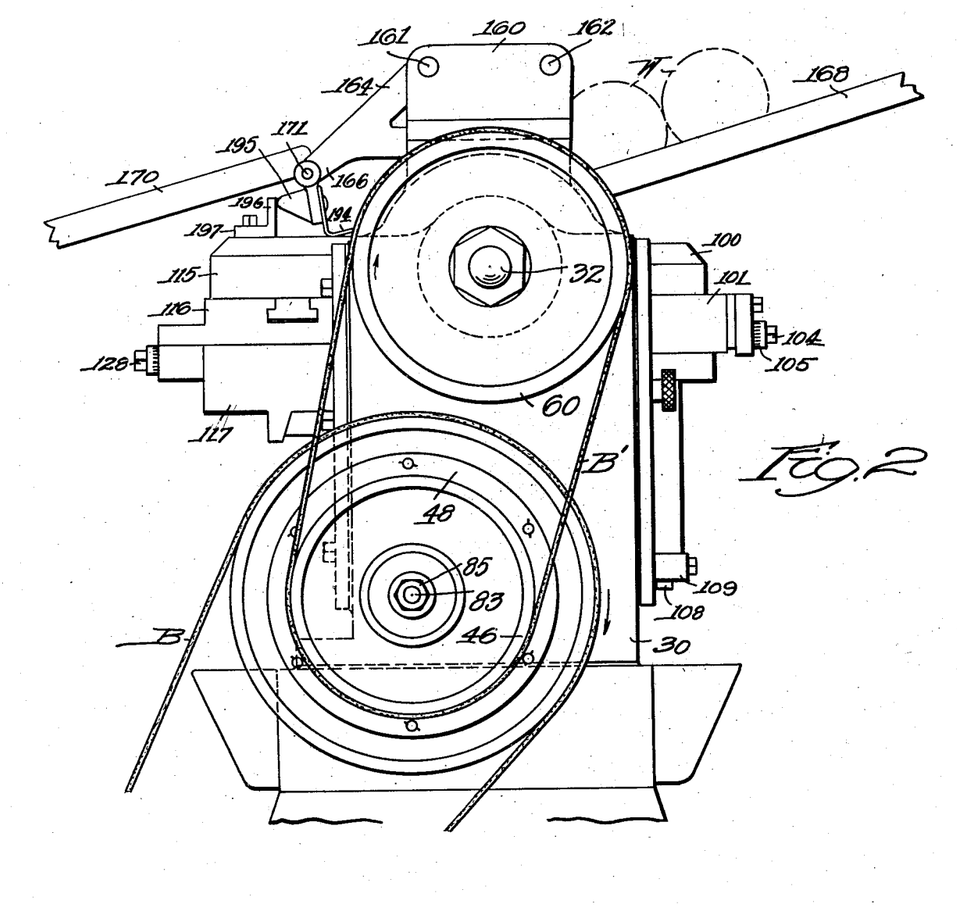
Fig. 2 is a rear end elevation of our improved lathe, looking in the direction of the arrow 2 in Fig. 1.

Referring to the drawings, our improved automatic lathe is shown as comprising a frame 30 (Fig. 1) having a head 31 for a work spindle 32 and having a tail stock 33 in which a tail center 34 is slidably mounted. The work W is mounted between the coneshaped end of the spindle 32 and the tail center 34, which is advanced to engage the work by means of a lever 36 (Figs. 1 and 7) which may be automatically operated by suitable driving connections not shown and forming no part of our present invention. Other usual means for supporting and centering the work may be substituted when desired.

Driving mechanism

Our improved lathe is provided with a lower or main shaft 40 (Fig. 4) rotatable in bearings 41 and 42 in the lathe frame 30 and having a pulley 43 secured thereto. The pulley 43 may be rotated by a belt B from any suitable source of power. A sleeve 45 is slidably mounted on the end of the shaft 40 and provides a bearing for a pulley 46 loosely rotatable thereon. The pulley 46 has a flange 48 to which is secured an annular friction plate 49 extending inward between friction rings 50 rotatable with the driving pulley 43. A pressure plate 51 is slidably supported on studs 52 in the web of the pulley 43 and springs 54 on the studs 52 act to press the plate 51 yieldingly against the friction rings 50, causing these rings to frictionally engage and drive the annular plate 49 carried by the pulley 46.

One or more clutch fingers 56 (Fig. 4) pivoted on the pressure plate 51 are engaged by the ends of studs 57 on the pulley 43 and the sleeve 45 has an end flange 58 engaging the fingers 56. When the sleeve is moved to the right in Fig. 4 by mechanism to be described, the fingers 56 will rock against the studs 57, thereby forcing the plate 51 to the left, compressing the springs 54 and releasing the driving pressure on the annular plate 49. The rotation of the pulley 46 is thus discontinued. The pulley 46 is connected by a belt B' to a pulley 60 secured on the end of the work spindle 32 previously described.

Spindle stopping mechanism

We have provided special control mechanism by which rotation of the work spindle will be stopped periodically to permit removal and replacement of the work. For this purpose a worm sleeve 62 (Fig. 4) is loosely mounted on the driving shaft 40 between a collar 63 fixed on the shaft and a collar 64 slidable on the shaft 40. The collar 64 has a driving lug or tooth 65 seated in a notch 66 in the end of the worm sleeve 62, the parts being yieldingly held in engagement by a coil spring 67 on the shaft 40. The worm 62 drives a worm wheel 70 fast on the cam shaft 71 by which various parts of the lathe are operated.

Figures 4, 4A, 5, 6:
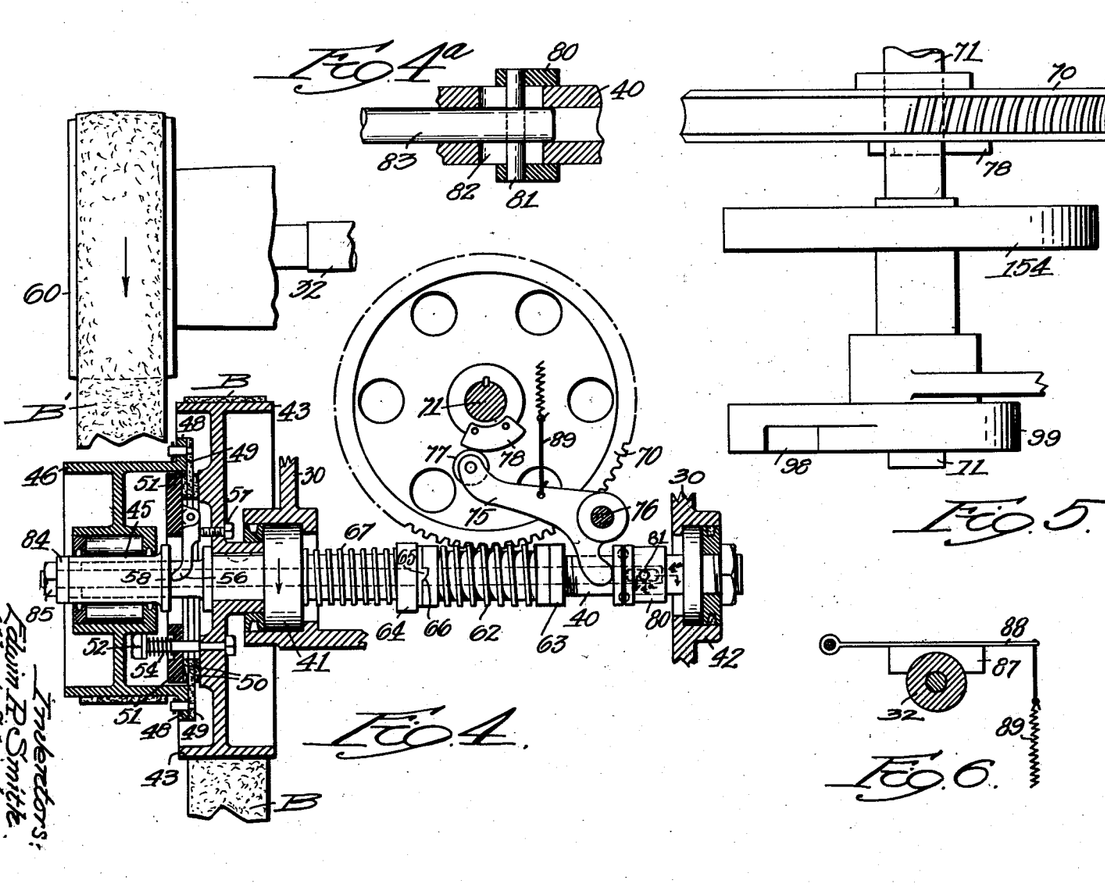

If for any reason rotation of the worm wheel 70 is prevented, the yielding connection from the shaft 40 through the collar 64 to the worm sleeve 62 provides a give-way or safety device, so that the parts merely slip by each other without breakage of the mechanism. It will be understood that the collar 64 is slidable but non-rotatable on the shaft 40.

A release lever 75 (Fig. 4) is mounted on a fixed pivot 76 and is provided with a roll 77 engaged by a cam plate 78 secured to the hub of the worm wheel 70. The lower arm of the lever 75 is forked to embrace the shaft 40 and engages a collar 80 slidable on the shaft 40. A cross pin 81 (Fig. 4ª) is fixed in the collar 80 and extends through a slot 82 in the shaft 40 and also extends through an opening in the end of a rod 83 slidable in an axial opening in the shaft 40. At its left hand end, the rod 83 extends beyond the end of the shaft 40 and is provided with a collar or disc 84 (Fig. 4) secured thereon by a nut 85 and engaging the left hand end of the sliding sleeve 45 by which the clutch fingers 56 are operated.

From this description of the driving mechanism, it will be seen that the shaft 40 is continuously rotated by the belt B, driving the worm 62 through the give-way or safety connection and continuously rotating the worm wheel 70, carrying the cam plate 78. Once in each rotation of the worm wheel 70, the cam lever 75 is depressed, moving the collar 80 and rod 83 to the right, thus causing the sleeve 45 to engage the clutch fingers 56 and disconnect and release the friction clutch, thereby disconnecting the pulley 46 from the driving spindle and permitting the work spindle to come to rest.

It is desirable that the work spindle stop quickly when thus released and for this purpose we provide a brake member 87 (Figs. 6 and 7) mounted on a pivoted arm 88 and having a yielding connection 89 to the lever 75. As the lever 75 is depressed, the arm 88 is pulled downward, forcing the brake member 87 against the work spindle 32 and bringing the same quickly to rest.

Carriage mechanism

A tool carriage 90 (Figs. 1 and 17) is mounted to slide longitudinally on guideways 91 on the side of the frame 30. A link 92 (Fig. 1) is pivoted at 93 on the carriage 90 and at its opposite end is pivoted at 94 to an arm 95 swinging about a fixed pivot 96. The arm 95 is provided with a cam roll 97 positioned in a cam groove 98 in the side of a cam 99 (Fig. 5) fast on the cam shaft 71. As the cam shaft is rotated, the carriage 90 is given a reciprocating movement with any desired variations in speed or periods of rest.

Cross feed mechanism

One or more tool holders 100 (Fig. 17) are mounted on a cross slide 101 and are adjustable thereon axially of the lathe. The cross slide is mounted in suitable guideways in the carriage 90 and a spring 102 for each slide acts to yieldingly force the slide and tool away from the work.

A block 103 (Fig. 19) is slidably but non-rotatably mounted beneath the cross slide and is positioned relative thereto by an adjusting screw 104 projecting from the front of the slide and having a graduated dial or collar 105. The block 103 is provided with a cross groove or recess 106 adapted to receive a crankpin 107 mounted on the upper end of a feed shaft 108.

The shaft 108 is vertically mounted for angular movement in a bearing in the carriage 90 and at its lower end is provided with a clamping collar 109 (Fig. 18) having a cam-engaging member 110 secured thereto and positioned to engage a cam plate 111 as the carriage is moved along its guide-ways on the frame 30. The cam plate 111 is mounted on a bracket 112 longitudinally adjustable on a bar 113 (Fig. 17) which in turn is secured to the side of the frame 30. The cam plate 111 may be easily removed and replaced and by selecting plates of different outlines, any desired transverse movement of the tools in the slide 100 may be obtained.

It will be noted that we thus obtain our cross feed movement by extremely simple connections, the movement being dependent upon the axial movement of the carriage 90 and being widely variable by changing the shape of the cam plate 111.

Back tool slide

Figures 17, 18, 19, 20:
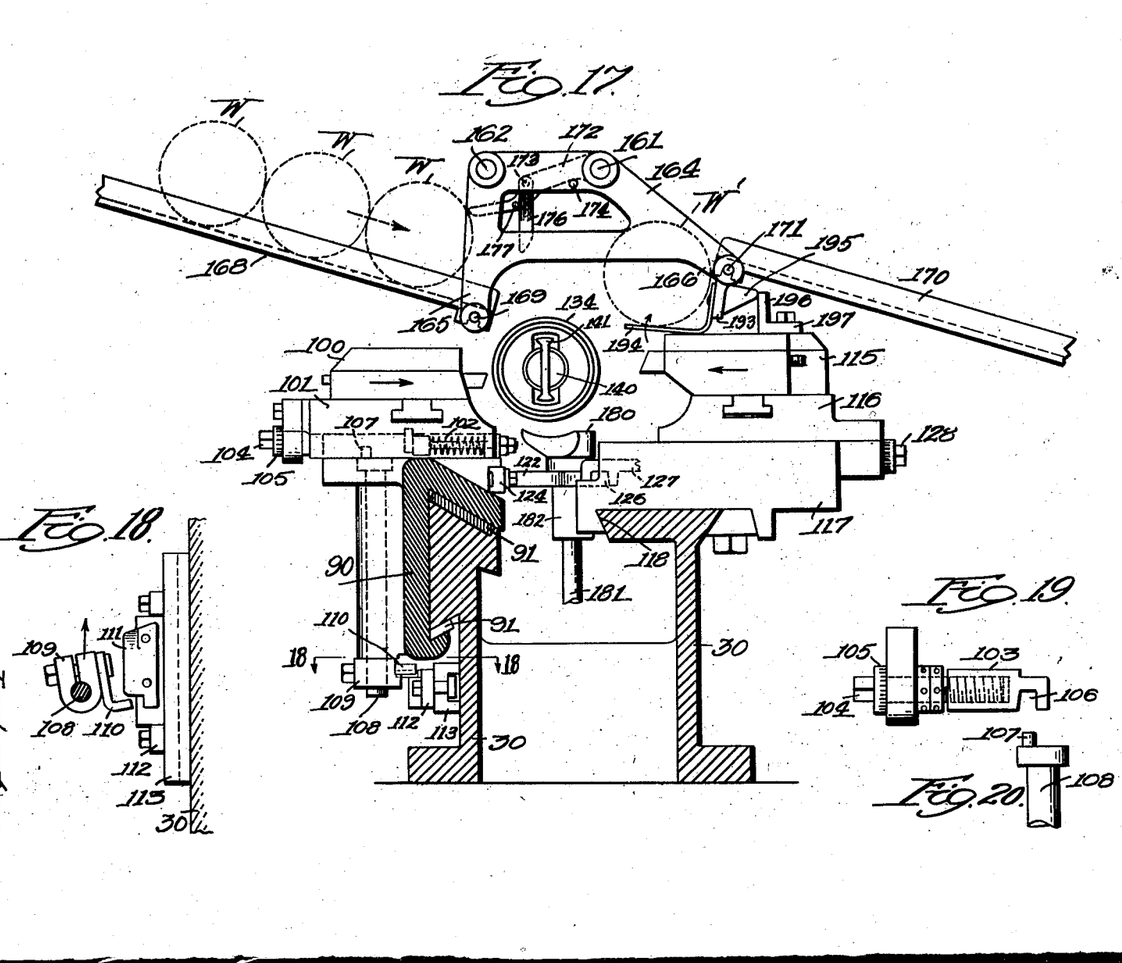
Fig. 17 is a sectional front elevation of the machine, taken along the line 17—17 in Fig. 11.
Fig. 18 is a detail sectional plan view, taken along the line 18—18 in Fig. 17.
Figs. 19 to 20 are detail front elevations of certain tool slide operating mechanism.

A second tool holder 115 (Fig. 17) is mounted on a second tool slide 116 slidable in guide-ways in a stand 117 adapted to be clamped in fixed position on guide-ways 118 at the rear side of the work. The tool slide is moved toward and from the work by a bell crank 120 (Figs. 11 and 12) mounted on a fixed pivot 121 and having a forwardly projecting arm 122 extending into a recess 123 (Fig. 14) in a plate 124 secured to the rear face of the front tool carriage 90. The second arm 125 of the lever 120 extends rearward into an opening 126 (Fig. 13) in the front end of a member 127 (Fig. 12) slidably mounted under the tool slide 116 and adjustable relatively by an adjusting screw 128 (Fig. 17). As the tool carriage 90 is moved axially, the bell crank 120 will be effective to move the tools in the rear slide 116 toward and from the work in timed relation to the movement of the carriage 90. Other usual operating mechanism for the rear tool slide may be substituted if desired.

Work spindle construction

The details of construction of the work spindle 32 are shown in Figs. 7 to 10 inclusive. The spindle 32 is rotatable in bearings 130 and 131 (Fig. 7) in the work head 31 and the drive pulley 60 previously described is fast on the outer end of the spindle 32. The opposite end of the spindle is provided with a tapered recess adapted to receive the tapered shank of a live center 133 (Fig. 9) having a flanged head 134, the outer face of which has a beveled portion 135 and a cylindrical portion 136. The bevel 135 centers the work W (Fig. 15) so that it will slip over the cylindrical portion 136 and be supported thereby.

Figures 11, 12, 13, 14, 15, 16, 16A:
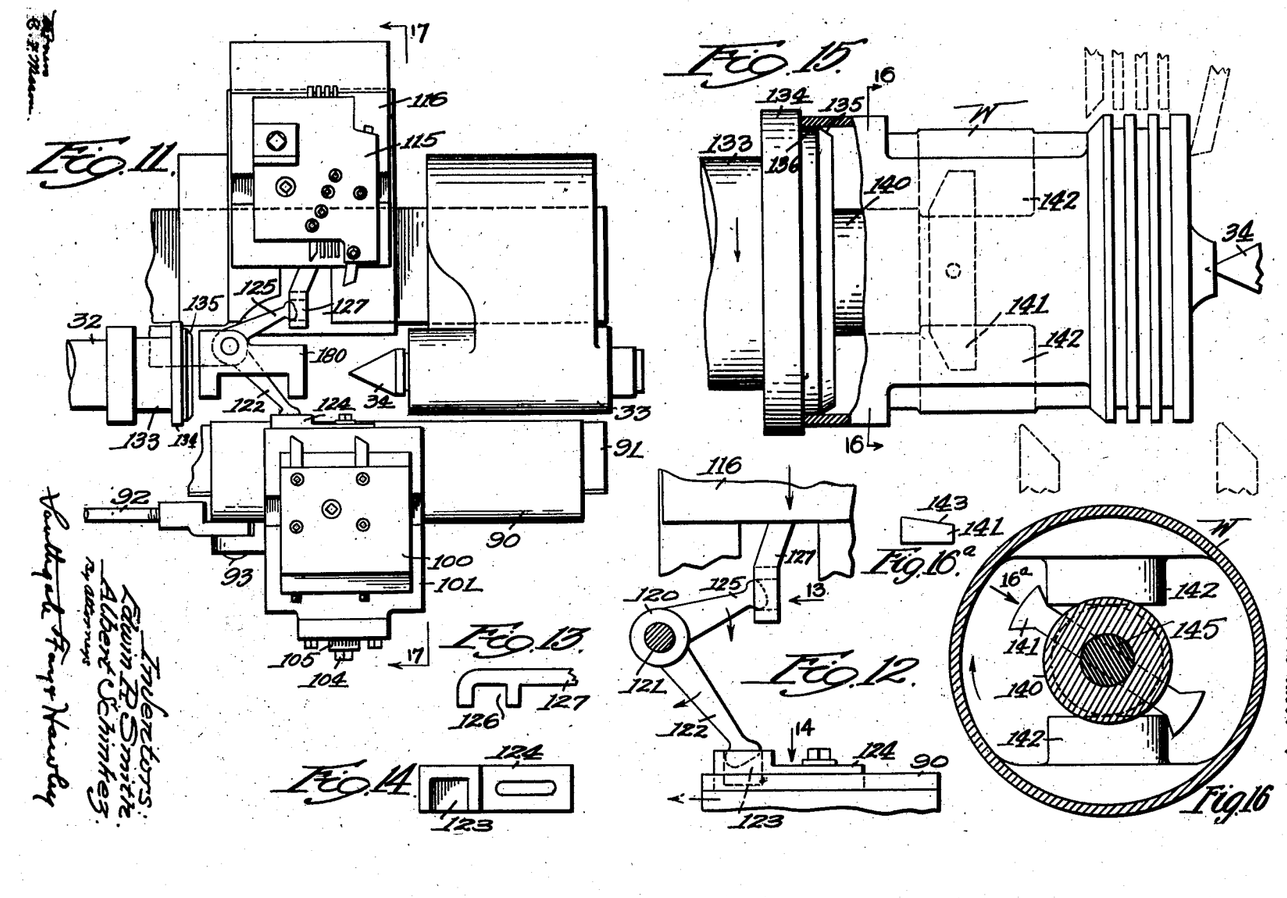

A driving member 140 (Fig. 9) is slidable in an axial opening in the live center 133 and is keyed to prevent relative angular movement. At its outer end the member 140 is provided with a cross bar 141 adapted to be pushed forward within the piston or work W and to engage the cross pin lugs 142 (Fig. 16) thereof, thus positively rotating the piston. The outer faces of the ends of the cross bar 141 are beveled as indicated at 143 in Fig. 16ª, so that the piston may be turned slightly on the supporting surface 136 if the cross bar happens to be aligned with the lugs 142 when advanced to driving position.

A rod 145 (Fig. 9) is threaded into the driving member 140 and is slidable through the shank of the live center 133. A grooved collar 146 (Fig. 7) is slidable on the spindle 32 and a cross pin 147 in the collar extends through slots 148 in the spindle and connects with the rod 145 for moving the same axially.

An actuating lever 150 (Fig. 7) is mounted on a fixed pivot 151 and has its upper end positioned in the groove of the collar 146. A cam roll 152 on the lever 150 is positioned in a groove 153 in a double cam 154 fast on the cam shaft 71.

Figures 7, 8, 9, 10:
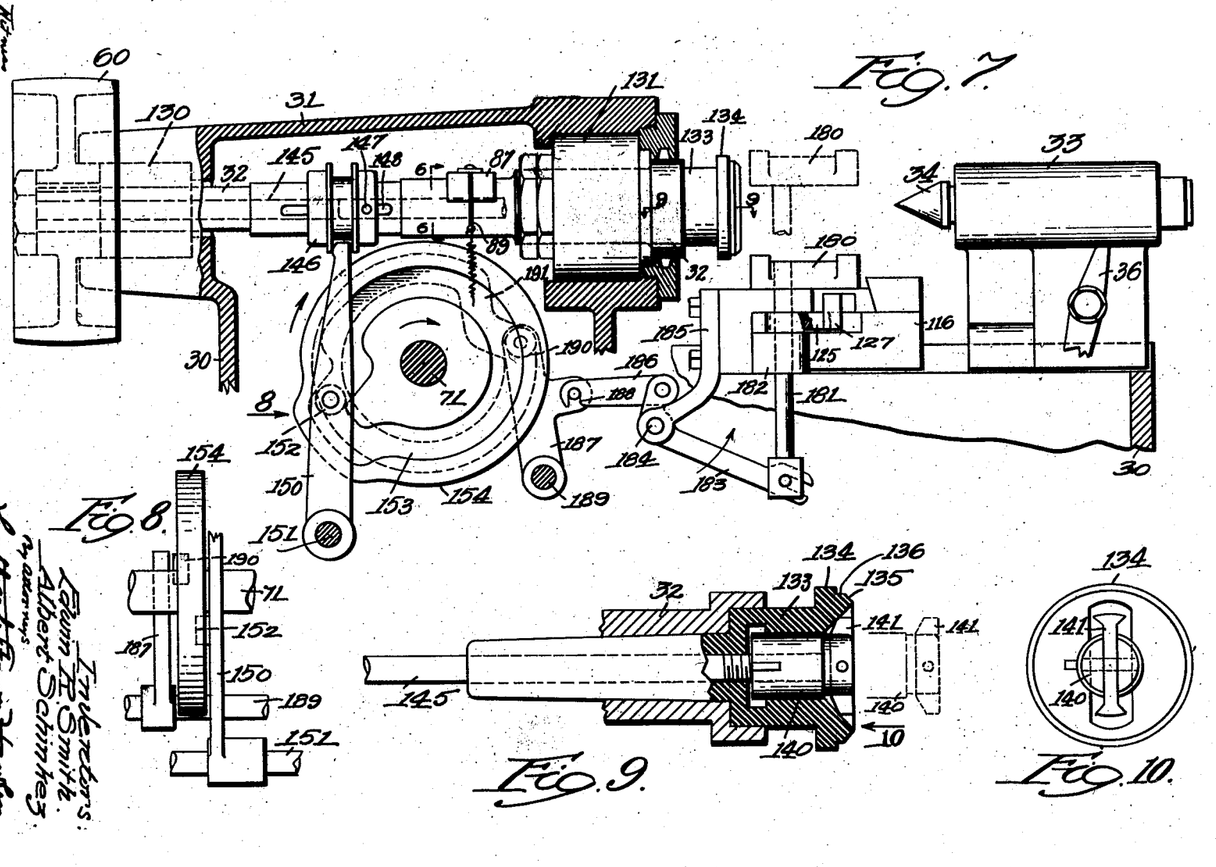
Fig. 7 is a sectional side elevation of the work spindle and certain actuating mechanism.
Fig. 8 is a detail rear elevation of certain parts, looking in the direction of the arrow 8 in Fig. 7.
Fig. 9 is a sectional view of a portion of the work spindle, taken along the line 9—9 in Fig. 7.
Fig. 10 is an end view of the work spindle, looking in the direction of the arrow 10 in Fig. 9.

As the cam is continuously rotated, the grooved collar is actuated to advance the cross bar 141 of the driving member 140 into the newly inserted work, maintaining it in such position until the operations thereon are completed, and thereafter withdrawing the driving member before the work is removed.

Work feeding mechanism

We have provided special devices for automatically feeding the work to the machine and for removing the work therefrom. For this purpose a bracket 160 (Fig. 1) is fastened to the top of the spindle casing 31 and is provided with parallel rods 161 and 162 (Fig. 3) for supporting the feeding mechanism. Side frame members 164 (Figs. 3 and 17) are mounted on the rods 161 and 162 and are provided with front and rear depending portions 165 and 166 (Fig. 17). A guide-way or chute 168 is supported on a cross rod 169 in the frame portion 165 and extends upwardly and to the left in Fig. 17, the outer end of the chute being supported in any convenient manner (not shown). A discharge chute 170 is supported at one end on a cross rod 171 in the frame portions 165 and 166 and the lower outer end of the delivery chute is supported in any convenient manner (not shown).

Figure 3:
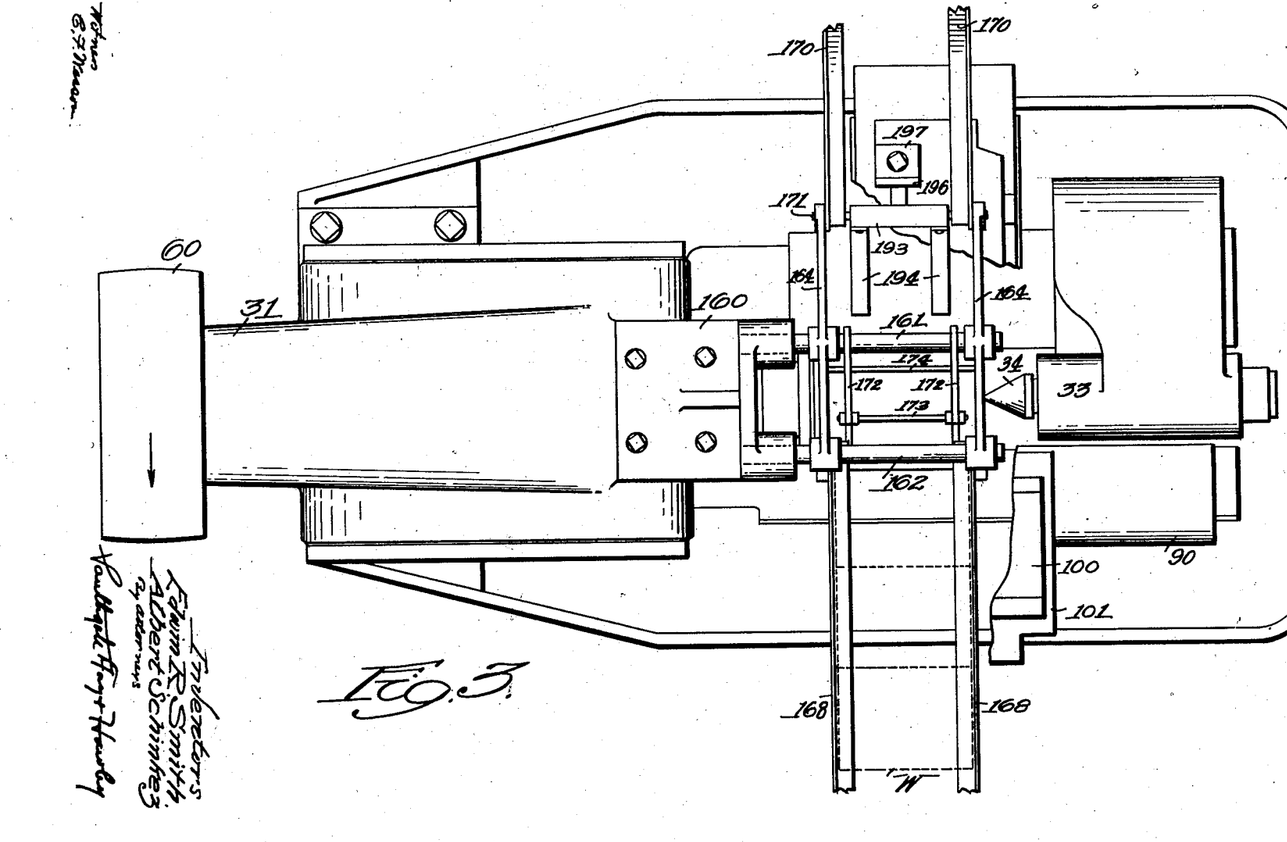
Fig. 3 is a plan view of our improved lathe.

A pair of lever arms 172 are pivoted on the supporting rod 161 and are preferably tied together by a cross rod 173 (Fig. 3). Downward movement of the arms 172 is limited by a fixed cross rod 174 in the side frame members 164. The free ends of the arms 172 extend below the supporting rod 162 and are normally in position to engage the work W on the feed chute 168 and prevent downward movement thereof. Depending fingers 176 are pivoted on the tie rod 173 and are prevented from swinging to the left in Fig. 17 by stop pins 177, while they are entirely free to swing in the opposite direction.

An elevating member 180 (Fig. 17) is mounted on the upper end of a rod 181 slidable in a fixed bearing 182 (Fig. 7) and has a pin and slot connection at its lower end with a bell crank 183 pivoted at 184 on a fixed bracket 185 and connected by a link 186 to a cam lever 187. The connection between the link and the lever preferably includes an open slot 188, permitting the link to be swung upward to disconnect the elevating mechanism when so desired.

The cam lever 187 is pivoted at 189 and is provided with a cam roll 190 positioned in a groove 191 on the rear face of the double cam 154 previously described. The cam groove is so designed that the elevating mechanism is maintained in its lower position during all operations upon the work, but is thereafter briefly raised for removal and replacement of the work.

An arm 193 (Fig. 17) is pivotally mounted on the cross rod 171 which supports the delivery chute 170, and a work-supporting plate or bracket 194 is mounted on the arm 193 and projects to the left therefrom. A lug 195 on the back of the arm 193 engages an upward projection 196 of a bracket 197 secured to the top of the back tool slide 115.

Operation of feed and delivery mechanism

The operation of the feed and delivery mechanism above described is as follows:—

Assuming that a piece of work W has been completed and the driving member 140 and cross bar 141 have been withdrawn, the elevating member 180 is then raised, lifting the finished piece of work into engagement with the depending fingers 176 on the swinging arms 172. Such engagement raises the arms to release the next piece of work on the feed chute 168. This new piece of work rolls down the chute when released, swinging the fingers 176 freely out of its path and pushing the finished work to the right to the position indicated at W' in Fig. 17, where it is supported on the swinging bracket 194. The new piece of work meanwhile rests on the elevating member 180.

The member 180 is then depressed, presenting the new piece of work between the lathe centers. The tail center 34 is then advanced, preferably automatically, to place the work in operative relation to the head center 134, as indicated in Fig. 15.

As the elevating member 180 moves downward with the work, the arms 172 also swing downward, engaging the next piece of work on the feed chute and preventing downward movement thereof. As the back tool slide 115 is thereafter advanced to operative position, the arm 193 and support 194 are swung upward and the finished work W' rolls down the delivery chute 170.

By using the elevating mechanism and having the delivery chute correspondingly elevated, the work may be delivered automatically, if desired, to a succeeding machine for further operations without manually raising the work to a higher level. It is thus possible to operate a series of different machines side by side, each performing successive operations upon the work, and to advance the work automatically from each machine to the next.

Insertion and removal of the work in a direction transverse to the path of movement of the tools operating thereon is an essential advantage, as it leaves the space at the two opposite sides of the work free and clear for the simultaneous performance of separate machine operations thereon, as by advancing front and rear tools to operative engagement therewith.

General operation of the machine

It is believed that the general operation of the machine will be readily apparent from the foregoing detailed description. After the work is automatically inserted, the continued rotation of the cam shaft 71 causes axial movement of the front tool carriage 90 and during such initial axial movement the cam plate 111 (Fig. 18) partially rotates the shaft 108 to advance the tool slide 101 to the desired operative position. At the same time, the bell crank 120 (Fig. 11) moves the back tool slide forward as the carriage 90 moves axially, thus performing desired grooving, beveling, facing, or cutting-off operations with the tools in the back tool holder 115. The front tool slide 101 remains in rearward or operative position while it is moved axially of the work, thus performing cylindrical turning operations.

After the work is completed, the driving member 140 is withdrawn, the drive of the work spindle is disconnected, the brake block 87 is applied to quickly bring the spindle to rest, the tail center is withdrawn (by mechanism not shown) and the work W' is removed by the elevating member 180 and placed upon the swinging support 194 by which it is thereafter swung upward to the discharge or delivery chute 170. A fresh piece of work W is then inserted as previously described in detail, the spindle drive is automatically restored, and the cycle of operations is repeated. The whole procedure is preferably entirely automatic.

We are thus able to produce a large volume of duplicate work with a minimum of attention by the operator and at a very low production cost.

Having thus described our invention and the advantages thereof, we do not wish to be limited to the details herein disclosed, otherwise than as set forth in the claims, but what we claim is:—

1. In a machine tool, rotatable work driving mechanism, automatic means effective to feed pieces of work thereto in a direction substantially transverse to the axis of rotation of said driving mechanism, means to lower said work to operating position, to raise said work after operating of the machine thereon and thereafter to positively eject the work from the machine, and means synchronized with said last means to automatically feed said driving mechanism into and out of engagement with the work, and means to operate on the work while rotated by said driving mechanism.

2. In a machine tool, rotatable work driving mechanism, a storage magazine, means to release pieces of work singly therefrom, means to lower said work to driving position, to raise said work after operation of the machine thereon, and to eject the work from the machine, means synchronized with said last means, to feed said driving mechanism automatically into and out of engagement with the work, the work remaining in substantially the same plane perpendicular to the axis of rotation of the driving mechanism throughout the feeding, finishing and discharging thereof.

3. In a machine tool, rotatable work driving mechanism, automatic means effective to feed pieces of work thereto in a direction substantially transverse to the axis of rotation of said driving mechanism, work engaging tools, and means to move said tools automatically to operative positions in directions substantially perpendicular to the direction of work feed, as said work is fed into operating position, and means to engage the work after operation of the machine thereon, to positively eject it from the machine.

4. In a machine tool, rotatable work driving mechanism, automatic means effective to feed pieces of work thereto in a direction substantially transverse to the axis of rotation of said driving mechanism, work-engaging tools disposed on two sides of the work, carriages for said tools and means to move said tools toward and from each other and the work in directions substantially transverse to the direction of work feed, and means controlled and actuated by one of said carriages, for engaging the work after operation of the machine thereon to positively eject it from the machine.

5. In a machine tool, rotatable work driving mechanism, automatic means effective to feed pieces of work thereto in a substantially vertical direction and to remove said pieces of work therefrom in a substantially vertical direction, work-engaging tools, slides therefor disposed on opposite sides of the work and means to advance said slides toward the work automatically in substantially horizontal directions, as said pieces of work are fed to operating position, and means to engage the work after operation of the machine thereon, to positively eject it from the machine.

6. In a machine tool, a tool carriage, rotatable work driving mechanism, a storage magazine, means to release pieces of work singly therefrom, means to lower said work to driving position and to raise said work after operation of the machine thereon, and means operable when said work reaches a pre-determined raised position to positively eject the work from the machine, said last named means being actuated by said carriage.

7. In a machine tool, a tool carriage, rotatable work driving mechanism, a storage magazine, means to lower work from said magazine to driving position and to raise said work after operation of the machine thereon, and means to positively eject the work from operating position, means to retain pieces of work in the magazine, actuatable by ejected work to release said pieces singly therefrom, said last named means being actuated by said carriage, the finished work receiving an initial discharge movement from engagement by an in-coming piece of new work.

8. In a machine tool, a tool carriage, rotatable work driving mechanism, a storage magazine, means to release pieces of work singly therefrom, means to lower said work to driving position and to raise said work after operation of the machine thereon, and a device effective to receive said raised finished work from said last means and to move said work further upward and discharge the same on a delivery device, said last named means being actuated by said carriage.

9. In a machine tool, rotatable work driving mechanism, a storage magazine, means to release pieces of work singly therefrom, means to lower said work to driving position and to raise said work after operation of the machine thereon, and a device effective to receive said raised finished work and to move said work further upward and discharge the same on a delivery device, and means to actuate, said latter device by movement of a tool slide toward the work after insertion of a new piece of work in the machine.

10. In a machine tool, a driving shaft, a work spindle, driving connections between said shaft and said spindle, automatic means in said driving connections, to stop and thereafter restore the rotation of said work spindle during the continued rotation of said driving shaft, and means controlled by said last means to apply a braking force to said work spindle to bring said spindle quickly to rest when disconnected from the driving shaft.

11. In a machine tool, a driving shaft, a work spindle, driving connections between said shaft and said spindle, a cam slowly rotatable by said driving shaft, and means operated by said cam effective to periodically disable the driving connection between said driving shaft and said work spindle, and means controlled by said last named means to apply a braking force to the work spindle to bring same quickly to rest when disconnected from the driving shaft, said driving connection being automatically restored after a predetermined further movement of said cam.

12. In a machine tool, a driving shaft, a work spindle, a brake for said spindle, driving connections between said shaft and said spindle, a cam slowly rotatable by said driving shaft, and means operated by said cam effective to periodically disable the driving connection between said driving shaft and said work spindle, said driving connection being automatically restored after a predetermined further movement of said cam and said cam being also effective to apply said brake to quickly stop said spindle when said spindle is disengaged from the driving shaft.

13. In a machine tool, a frame, a work spindle rotatably mounted thereon, a tool carriage slidably supported on said frame, a continuously rotated cam operatively connected to slide said carriage along said guideways axially and to provide periods of rest therefor, and means for starting and stopping the rotation of said work spindle in predetermined relation to the movements of said tool carriage.

14. In a machine tool, a frame, a tool carriage, means to move said carriage along said frame, a tool slide mounted for transverse movement on said carriage, a cam plate fixed on said frame, a slide operating shaft mounted in bearings on said carriage and having an arm engaging said cam plate and movable thereby as said carriage is moved longitudinally, and operating connections from said shaft to said slide, effective to move said slide toward and from the work.

15. In a machine tool, a frame, a tool carriage, means to move said carriage along said frame, a tool slide mounted for transverse movement on said carriage, a cam plate fixed on said frame, a slide operating shaft mounted in bearings on said carriage and having an arm engaging said cam plate and movable thereby as said carriage is moved longitudinally, a crankpin at the upper end of said shaft, and a recessed block adjustably mounted on said slide and engaged by said crankpin for movement of said slide thereby.

16. In a machine tool, a work spindle, means to center the work thereon, means to drive the work, and automatic means effective to advance said driving means axially to engage the work after insertion thereof and to withdraw said driving means within said work-centering means before removal and replacement of the work, the end faces of said driving means being inclined with respect to the axis of said driving means to facilitate engagement of said driving means with the work as said means is advanced into the work.

17. In a machine tool, a tool carriage, rotatable work driving mechanism, automatic means effective to feed pieces of work thereto in a direction substantially transverse to the axis of rotation of said driving mechanism, means to operate on the work while rotated by said driving mechanism, means to eject the work from operating position, and a device effective to receive said work from the ejecting means and to positively remove same from the machine, said last named means being actuated by said carriage.

18. In a machine tool, rotatable work driving mechanism, automatic means effective to feed pieces of work thereto in a direction substantially transverse to the axis of rotation of said driving mechanism and to lower said work into an operating position, said means being also effective to raise said work from operating position, and means operable by engagement with the raised work to remove same from the machine.

19. In a machine tool, rotatable work driving mechanism, automatic means effective to feed pieces of work thereto in a substantially vertical direction, and to remove said pieces of work therefrom in a substantially vertical direction, tool slides disposed on opposite sides of the work, means to advance said slides toward the work automatically in substantially horizontal directions, and means to synchronize the movements of said slides with each other, and means to raise the work after operation thereon by the tools to positively eject the work from the machine.

20. In a machine tool, rotatable work driving mechanism, a storage magazine, means to release pieces of work singly therefrom, means to lower said work to driving position and to raise said work after operation of the machine thereon, said releasing means being operable upon engagement therewith of a raised piece of work, and means to eject said raised piece of work from the machine as a new piece of work is released from the magazine.

21. In a machine tool for use with tubular work, a work spindle, means to center the work thereon, and means to drive the work automatic means effective to feed pieces of work to said driving means in a direction substantially transverse to the axis thereof, means to project said driving means from the work spindle into the work, said driving means being slidable but non-rotatable in the spindle and having means to engage the work internally when projected from the spindle.

In testimony whereof we have hereunto affixed our signatures.

EDWIN R. SMITH.
ALBERT SCHINKEZ.